(12) United States Patent
Barrow

(10) Patent No.: US 7,738,856 B1
(45) Date of Patent: Jun. 15, 2010

(54) SYSTEMS AND METHODS FOR PREPAID DISPATCH COMMUNICATIONS

(75) Inventor: Steven Wesley Barrow, South Riding, VA (US)

(73) Assignee: Nextel Communications Inc., Reston, VA (US)

( * ) Notice: Subject to any disclaimer, the term of this patent is extended or adjusted under 35 U.S.C. 154(b) by 951 days.

(21) Appl. No.: 11/348,249

(22) Filed: Feb. 7, 2006

(51) Int. Cl.
*H04M 11/00* (2006.01)

(52) U.S. Cl. .............. 455/406; 455/405; 455/408; 379/114.2

(58) Field of Classification Search .......... 455/406, 455/405, 408, 41.2; 379/114.2, 114.01; 370/311, 370/328, 350; 713/300
See application file for complete search history.

(56) References Cited

U.S. PATENT DOCUMENTS

| | | | |
|---|---|---|---|
| 6,640,109 B1* | 10/2003 | Drozt et al. ............ | 455/508 |
| 6,952,575 B1* | 10/2005 | Countryman et al. ....... | 455/408 |
| 6,956,939 B1* | 10/2005 | Boland et al. ........... | 379/220.01 |
| 2001/0014614 A1* | 8/2001 | Lautenschlager et al. ... | 455/553 |
| 2001/0018337 A1* | 8/2001 | Donovan et al. ........... | 455/406 |
| 2004/0185828 A1* | 9/2004 | Engelhart ................... | 455/408 |
| 2005/0130624 A1* | 6/2005 | Batni et al. ................ | 455/406 |
| 2005/0164707 A1* | 7/2005 | Batni et al. ................ | 455/445 |
| 2005/0216328 A1* | 9/2005 | Clark ......................... | 705/9 |

* cited by examiner

*Primary Examiner*—Danh C Le

(57) ABSTRACT

Systems and methods for prepaid dispatch communications are provided. The system includes a dispatch prepaid server that monitors an amount of prepaid services purchased for a dispatch station. The dispatch prepaid server provides provisioning information to a location register related to dispatch prepaid services. The location register provides an identification of the dispatch prepaid server to a dispatch processor. The dispatch processor monitors the duration of a call for the dispatch station and provides call duration information to the dispatch prepaid server.

17 Claims, 3 Drawing Sheets

SYSTEMS AND METHODS FOR PREPAID DISPATCH COMMUNICATIONS

BACKGROUND OF THE INVENTION

Wireless network operators provide access to their wireless communication networks using either postpaid or prepaid accounts. Postpaid accounts allow customers to pay for some portion of their wireless access after such access. For example, a postpaid account may involve prepaying for a set number of minutes of access on one monthly statement, and the customer then pays for the excess minutes of access on the next monthly statement. In contrast to postpaid accounts, prepaid accounts require an upfront payment prior to providing access to the network. The upfront payment is for a predetermined period of access, e.g., a number of minutes or number of days. Upon expiration of the predetermined period of access, the customer is not allowed access to the wireless communication network until they purchase a new or additional predetermined period of access.

Currently most prepaid techniques relate to interconnect voice communications. Interconnect voice communications are those offered by most wireless network operators as circuit-switched communications. Another type of voice communications that is being offered by more wireless network operators is dispatch voice communications. Dispatch voice communications are commonly known as walkie-talkie or push-to-talk (PTT) types of communications, such as Sprint Nextel Corporation's service identified by the trade name Direct Connect.

One technique for offering prepaid services for interconnect voice communication services involves an interconnect prepaid server that is located external to the wireless network operator's network. All interconnect calls for prepaid subscribers are routed through the interconnect prepaid server, which monitors the length of the calls and adjusts the amount of available access remaining based on the length of the interconnect calls. This technique requires all interconnect prepaid calls to be routed through a server located external to the network operator's network. Although there has been a fair amount of development of prepaid interconnect services, due to the relatively recent interest in deploying dispatch communication services, there has been relatively little development of prepaid dispatch services.

SUMMARY OF THE INVENTION

One technique for implementing prepaid dispatch voice services is to offer such services on a daily basis. This technique does not require additional network elements, as the prepaid dispatch subscribers have their accounts turned on or off, as applicable, on a nightly basis. However, this technique requires the network operator to run a computer program at a specific time each night (typically during a period of low network usage) to update the prepaid dispatch subscriber accounts (i.e., to turn the account on or off). Additionally, this does not allow a network operator to provide prepaid services in time periods less than one full day, and does not allow the network operator to provide real-time prepaid dispatch accounts.

The present invention overcomes the above-identified and other deficiencies of conventional techniques to provide prepaid dispatch communications. The present invention allows a dispatch prepaid account to be updated in real-time, or near real-time. In accordance with exemplary embodiments of the present invention, a dispatch prepaid server is provided. The dispatch prepaid server monitors a prepaid dispatch station's usage. When the dispatch prepaid services have been consumed, the dispatch prepaid server can notify the home location register to set the dispatch prepaid dispatch station's account to an inactive status.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
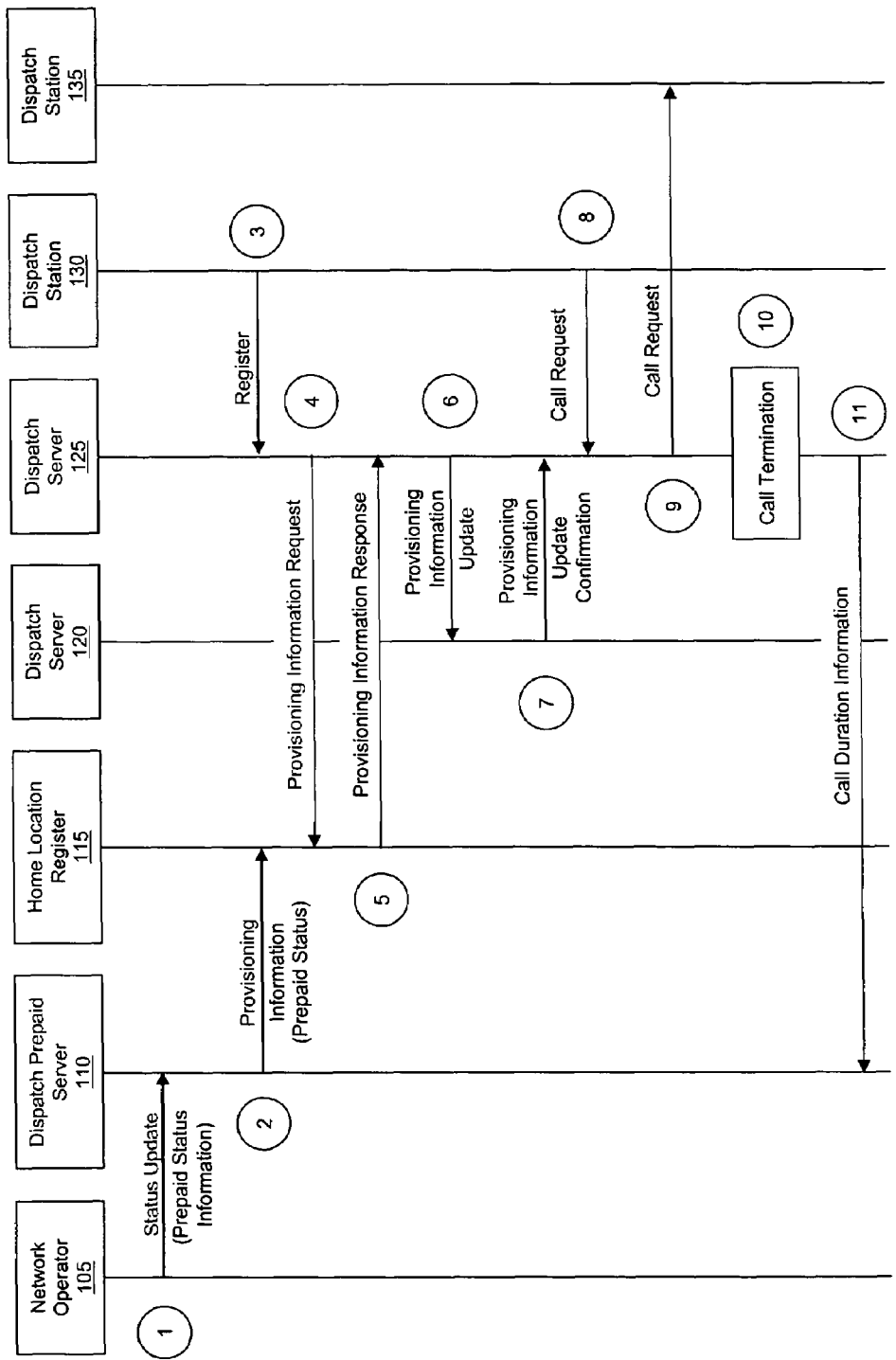
FIG. 1 is a signaling flow diagram of an exemplary method for providing prepaid dispatch communications in accordance with the present invention.

FIG. 1 is a signaling flow diagram of an exemplary method for providing prepaid dispatch communications in accordance with the present invention. The method is used in a system that includes a network operator 105, dispatch prepaid server 110, home location register 115, dispatch servers 120 and 125, and dispatch prepaid station 130 and postpaid dispatch station 135. In this system dispatch servers 120 and 125 can be dispatch application processors (DAPs) and are components of a dispatch complex. A dispatch complex is a network entity comprising a number of dispatch servers supporting a particular geographic area. The dispatch prepaid server 110 can be coupled to a provisioning interface of home location register 115, and can be coupled to dispatch servers 120 and 125 by a TCP/IP connection.

When the network operator 105 receives a payment for a prepaid dispatch subscriber's account, the network operator 105 sends a status update to the dispatch prepaid server 110 (step 1). This can be performed automatically, such as in response to the purchase of prepaid services for the dispatch station from a website. The status update will indicate the particular dispatch station, service status (i.e., whether the account is active or inactive) and the number of prepaid minutes. The dispatch prepaid server 110 then sends a provisioning command to the home location register supporting the particular dispatch station (step 2). The provisioning command has a dispatch station's prepaid field set to "Y", the prepaid dispatch station's status set to "Active" and the address (e.g., an IP address) of the dispatch prepaid server 110. Accordingly, home location register 115 will include dispatch station records that include, among others, a prepaid dispatch station field (indicating whether the dispatch station is a prepaid dispatch station) and a prepaid server address field.

When dispatch station 130 attempts to register with dispatch server 125 (step 3), dispatch server 125 sends a provisioning information request to home location register 115 (step 4). The home location register sends a provisioning information response (step 5). The provisioning information response will include various types of information related to the dispatch station, including that dispatch station 130 is a prepaid dispatch station and an address of dispatch prepaid server 110. Dispatch server 125 then sends a provisioning information update to each dispatch server that is part of the dispatch complex (step 6), and receives a provisioning information update confirmation from each dispatch server (step 7). The provisioning information update can include an identification of the prepaid dispatch station and the dispatch station's status set as "Active."

When dispatch station 130 sends a call request to dispatch server 125 for a call to dispatch station 135 (step 8), dispatch server 125 forwards the call request to dispatch station 135 (step 9) and establishes the call. Dispatch server 125 monitors the length of the call, and upon call termination (step 10), sends a message with the duration of the call to dispatch prepaid server 110 (step 11).

Figure 2:
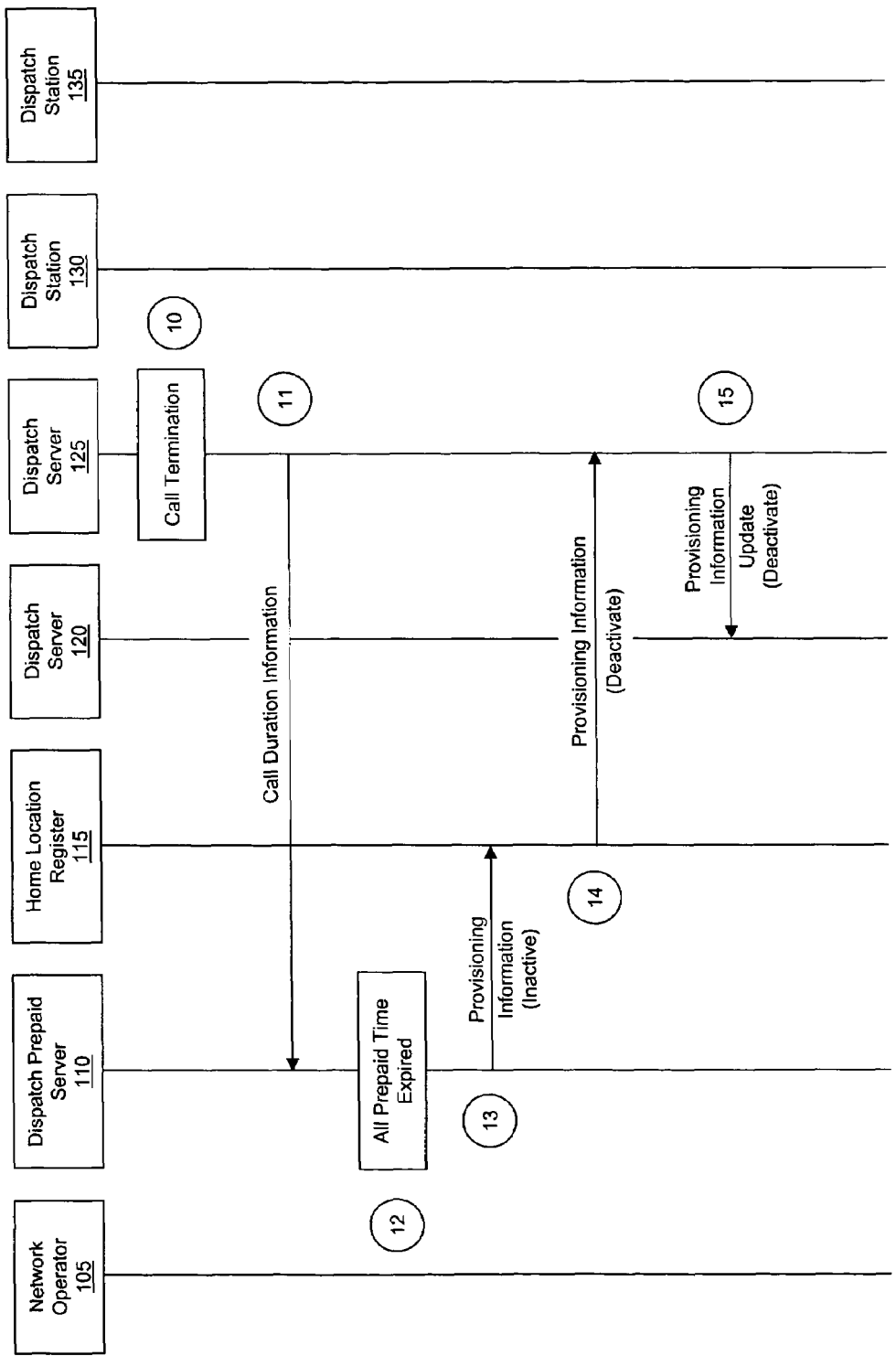
FIG. 2 is a signaling flow diagram of an exemplary method for setting a dispatch station's account to an inactive status upon expiration of dispatch prepaid service in accordance with the present invention.

FIG. 2 is a signaling flow diagram of an exemplary method for setting a dispatch station's account to an inactive status upon expiration of dispatch prepaid service in accordance with the present invention. When a dispatch call involving dispatch station 125 terminates (step 10) and dispatch server 125 sends the duration information to dispatch prepaid server, the dispatch prepaid server reduces the amount of prepaid time by the call duration. When all of the prepaid time has expired (step 12), dispatch prepaid server 110 sends provisioning information to home location register 115 (step 13). The provisioning information indicates that an account for the dispatch station 130 should be set to inactive. Home location register 115 then sends provisioning information to deactivate dispatch station 130 to dispatch server 125 (step 14). Dispatch server 125 then sends the provisioning update information to each dispatch server of the dispatch complex (step 15). The provisioning information can include the dispatch station's identification and prepaid status set to "Remove". Accordingly, any further attempts by dispatch station 130 to register or otherwise access the network will be denied until additional prepaid dispatch services are purchased.

Figure 3:
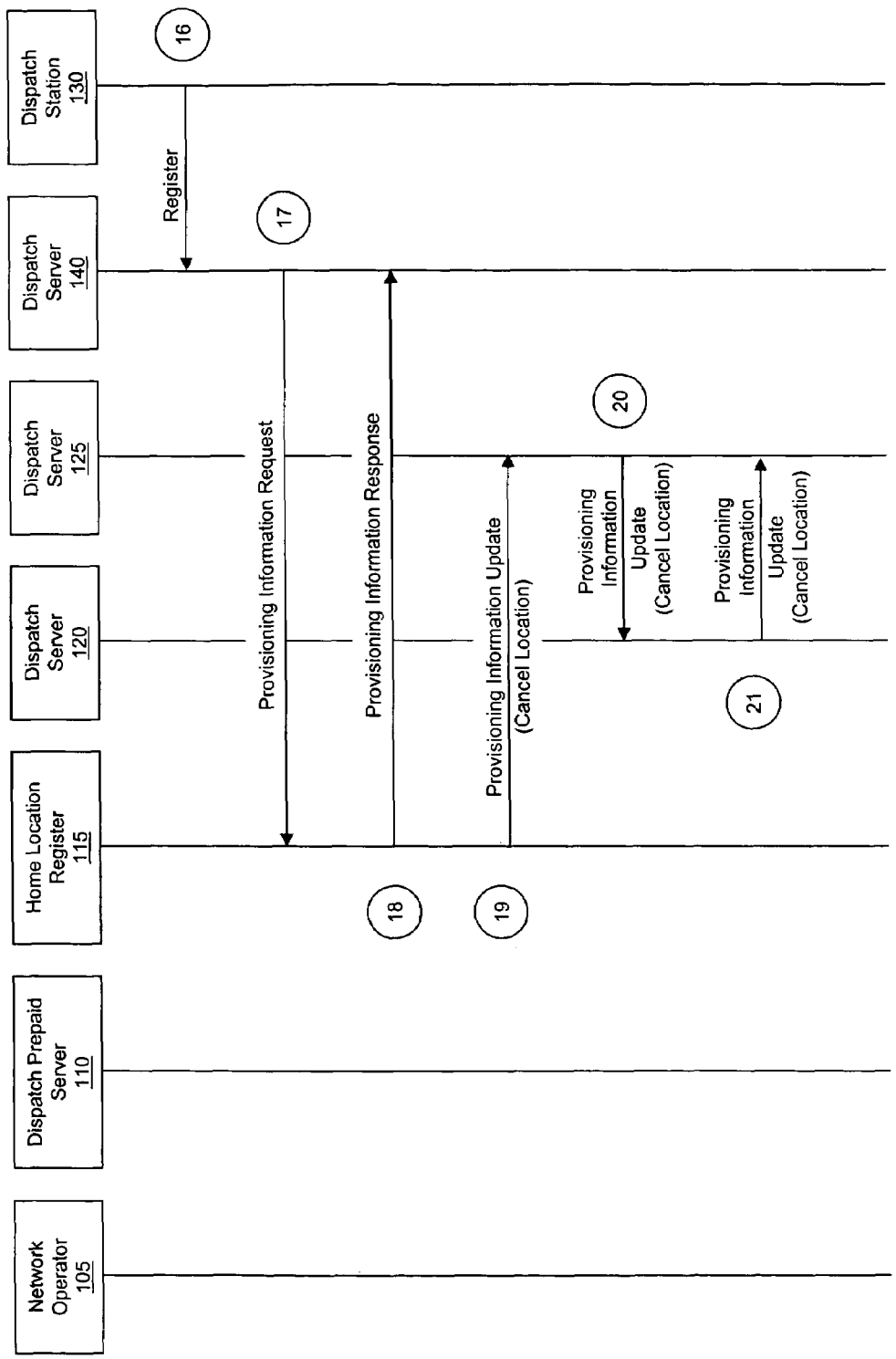
FIG. 3 is a signaling flow diagram of an exemplary method for updating a dispatch prepaid dispatch station's location in accordance with the present invention.

FIG. 3 is a signaling flow diagram of an exemplary method for updating a dispatch prepaid dispatch station's location in accordance with the present invention. The method of FIG. 3 assumes that dispatch station 130 previously registered with a dispatch complex that includes dispatch servers 120 and 125, and in particular registered with dispatch server 125. The method also assumes that dispatch server 140 is located in a different dispatch complex from dispatch servers 120 and 125. When dispatch station 130 registers with dispatch server 140 (step 16), dispatch server 140 sends a provisioning information request to home location register 115 (step 17). Home location register 115 sends a provisioning information response to dispatch server 140 (step 18). Recognizing that dispatch station previously registered with dispatch server 125, home location register 115 sends a provisioning information update instructing dispatch server 125 to cancel the location of dispatch station 130 (step 19). Dispatch server 125 then sends a provisioning information update to each dispatch server in the same dispatch complex in order to cancel the location of dispatch station 130 (step 20). The provisioning information can include the dispatch station's identification and prepaid status set to "Remove". Dispatch server 125 receives a confirmation message from each dispatch server in the same dispatch complex that the dispatch station's location has been canceled (step 21).

Each of the network entities described above can include a processor and memory. The memory can store a computer program product, which when executed by the processor, causes the processor to perform the actions described above. The processor can be any type of processor including a microprocessor, application specific integrated circuit (ASIC), field programmable gate array (FPGA) and/or the like. The memory can be any type of memory including random access memory, read only memory, flash memory, a hard drive and/or the like.

Although exemplary embodiments of the present invention have been described in connection with particular messages, the present invention can be employed with other types of messages. Moreover, the present invention has been described in connection with a prepaid dispatch station. This dispatch station can be associated with one or more prepaid dispatch subscribers. Accordingly, the home location register records can be for a specific subscriber and/or for a specific dispatch station.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for prepaid dispatch communications, the method comprising the acts of:
   receiving, by a location register from a dispatch server, a request for information for a dispatch station;
   accessing information for the dispatch station; and
   sending, by the location register to the dispatch server, a response to the request for information, wherein the response identifies that the dispatch station subscribes to dispatch prepaid services, wherein when a call request from the dispatch station is received, the call request is forwarded to a target dispatch station without accessing information stored in the location register related to a prepaid status of the dispatch station.

2. The method of claim 1, further comprising the act of:
   receiving, by the location register from a dispatch prepaid server, provisioning information for the dispatch station.

3. The method of claim 2, wherein the provisioning information identifies that the dispatch station subscribes to dispatch prepaid services and includes an address of the dispatch prepaid server.

4. The method of claim 2, wherein the provisioning information identifies that the dispatch station's prepaid status is inactive.

5. The method of claim 2, further comprising the act of:
   receiving, by the dispatch prepaid server from the dispatch server, call duration information.

6. The method of claim 5, further comprising the act of:
   determining, by the dispatch prepaid server, an amount of usage remaining for the dispatch station.

7. The method of claim 6, wherein when there is no dispatch prepaid service remaining for the dispatch station, the method comprises the acts of:
   receiving, by the location register from a dispatch prepaid server, updated provisioning information for the dispatch station; and
   sending, by the location register to the dispatch server, the updated provisioning information.

8. The method of claim 7, further comprising the act of:
   removing a record for the dispatch station from a memory of the dispatch server.

9. The method of claim 1, further comprising the acts of:
   receiving, by the location register from another dispatch processor, a request for information for the dispatch station; and
   sending, by the location register to the dispatch processor, a request to remove the dispatch station's records.

10. The method of claim 1, further comprising the acts of sending, from the dispatch processor to another dispatch processor in a same dispatch complex, an identification that the dispatch station subscribes to prepaid services.

11. A system comprising:
a dispatch prepaid server;
a location register coupled to the dispatch prepaid server; and
a dispatch server coupled to the dispatch prepaid server, the dispatch server configured to forward a call request to a target dispatch station without accessing information stored in the location register related to a prepaid status of the dispatch station when a call request from the dispatch station is received, wherein the location register stores prepaid information for a dispatch station.

12. The system of claim 11, wherein the prepaid information is part of provisioning information, and the prepaid information includes an identification that the dispatch station subscribes to a dispatch prepaid service.

13. The system of claim 12, wherein the provisioning information includes an address of the dispatch prepaid server.

14. The system of claim 11, wherein the location register comprises:
a processor; and
a memory, wherein the memory stores a computer program product that when executed by the processor causes the processor to
receive a request for information for a dispatch station from the dispatch processor;
access information for the dispatch station; and
send a response to the dispatch processor, wherein the response identifies that the dispatch station subscribes to prepaid services.

15. A method for prepaid dispatch communications, the method comprising the acts of:
receiving, by a dispatch prepaid server, status information for a dispatch station;
sending, by the dispatch prepaid server to a location register, provisioning information that includes the status information;
receiving, by the dispatch prepaid server from a dispatch server, call duration information for a call of the dispatch station; and
determining, by the dispatch prepaid server, an amount of usage remaining for the dispatch station, wherein when there is no dispatch prepaid service remaining for the dispatch station, the method comprises the act of
sending, by the dispatch prepaid server to the location register, updated provisioning information for the dispatch station, wherein the location register sends the updated provisioning information to the dispatch server.

16. The method of claim 15, further comprising the act of:
determining, by the dispatch prepaid server, an amount of prepaid service remaining using the call duration information.

17. The method of claim 16, further comprising the act of sending, by the dispatch prepaid server to the location register, provisioning information indicating that a status of the dispatch station is inactive.

\* \* \* \* \*